No. 823,889. PATENTED JUNE 19, 1906.
J. M. McCHESNEY.
CLOTHES PIN.
APPLICATION FILED APR. 6, 1905.

Witnesses
Inventor
J. M. McChesney
by H. B. Wilson
Attorney

UNITED STATES PATENT OFFICE.

JESSE M. McCHESNEY, OF HONOLULU, TERRITORY OF HAWAII.

CLOTHES-PIN.

No. 823,889.          Specification of Letters Patent.          Patented June 19, 1906.

Application filed April 6, 1905. Serial No. 254,188.

*To all whom it may concern:*

Be it known that I, JESSE M. MCCHESNEY, a citizen of the United States, residing at Honolulu, Territory of Hawaii, have invented certain new and useful Improvements in Clothes-Pins; and I do declare the following to be a full, clear, and exact description of the invention, such as will enable others skilled in the art to which it appertains to make and use the same.

My invention relates to improvements in clothes-pins; and it consists in the construction, combination, and arrangement of devices hereinafter described and claimed.

Figure 1:
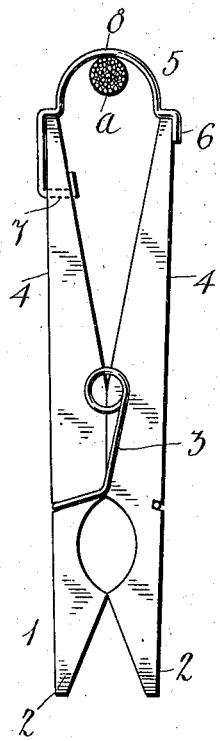
Figure 2:
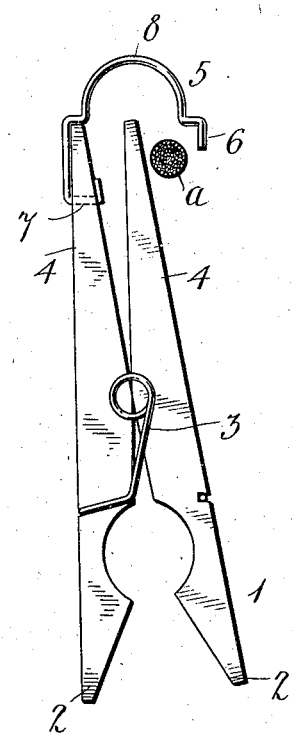

In the accompanying drawings, Figure 1 is an elevation of a clothes-pin embodying my invention, showing the same in use and attached to a clothes-line, the latter being shown in section; and Fig. 2 is a similar view showing the clothes-pin in position for detachment from the line.

The clothes-pin 1 comprises a pair of jaws 2, which are pivotally connected together or normally closed by a spring 3 and are provided with lever-arms 4. To the arm 4 of one of the jaws is pivotally connected a bail 5, which is preferably in the form here shown and is provided with a hook 6, adapted to engage the free end of the opposite lever-arm, so as to close the space between them. The said hook enables the pin to be suspended from a clothes-line, here indicated at *a*, and it will be understood that by the provision of the hook 6, against which one of the lever-arms closes, the pin is prevented from becoming casually detached from the line. The bail is formed, preferably, of a single piece of wire bent, as shown, to form a pivot 7, a line-engaging loop 8, and the hook or stop 6. The clothes-pin when in use hangs from the line, and it will be understood that the bail enables the pin to be readily attached to an article for hanging the same from the line, the article being clamped between the spring-pressed jaws 2. To detach the same from the line, the jaws must be opened, thereby causing a space to be formed between the hook or stop 6 and the free end of the lever, which closes against the same, the width of the space being sufficient to enable the bail to be disengaged from the line.

From the foregoing description, taken in connection with the accompanying drawings, the construction and operation of the device will be readily understood without requiring a more extended explanation.

Having thus described my invention, what I claim as new, and desire to secure by Letters Patent, is—

The herein-described clothes-pin comprising the pair of spring-pressed jaws, normally closed and each having a lever-arm, the said lever-arms being normally pressed apart at their outer ends by the action of the spring in closing the jaws, and the bail 5 pivoted to one of said lever-arms and having its pivot 7 in a bearing in, extending through and at right angles to said arm, said pivot preventing angular movement of the bail excepting at right angles to the common plane of the lever-arms, said bail extending across and arched above the space between the lever-arms, terminating in the downturned portion 6 overlapping and bearing against the outer side of the lever-arm opposite that to which said bail is pivoted, the said bail serving to suspend the pin and the load carried thereby from a line.

In testimony whereof I have hereunto set my hand in presence of two subscribing witnesses.

JESSE M. McCHESNEY.

Witnesses:
JAMES E. FULLERTON,
HERBERT B. GEHR.